US012261011B2

(12) United States Patent
Hori et al.

(10) Patent No.: US 12,261,011 B2
(45) Date of Patent: Mar. 25, 2025

(54) ACCELERATOR AND PARTICLE THERAPY SYSTEM

(71) Applicant: Hitachi—High Tech Corporation, Tokyo (JP)

(72) Inventors: Chishin Hori, Tokyo (JP); Fuutarou Ebina, Tokyo (JP); Kento Nishida, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 100 days.

(21) Appl. No.: 18/115,077

(22) Filed: Feb. 28, 2023

(65) Prior Publication Data

US 2023/0282436 A1 Sep. 7, 2023

(30) Foreign Application Priority Data

Mar. 2, 2022 (JP) ................................ 2022-031933

(51) Int. Cl.
*H01J 27/18* (2006.01)
*H01J 27/02* (2006.01)

(52) U.S. Cl.
CPC ............ *H01J 27/18* (2013.01); *H01J 27/022* (2013.01)

(58) Field of Classification Search
CPC .......... H01J 27/022; H01J 27/18; H05H 7/04; H05H 7/10; H05H 13/02; H05H 13/005; H05H 13/08; H05H 2007/002; H05H 2007/008; H05H 2007/043; H05H 2007/048
See application file for complete search history.

(56) References Cited

U.S. PATENT DOCUMENTS

| | | | | |
|---|---|---|---|---|
| 8,374,306 | B2 * | 2/2013 | Norling | G21G 1/10 315/502 |
| 9,894,747 | B2 * | 2/2018 | Pärnaste | H05H 13/005 |
| 10,340,051 | B2 * | 7/2019 | Pärnaste | H05H 7/001 |

(Continued)

FOREIGN PATENT DOCUMENTS

| | | |
|---|---|---|
| JP | 2019-133745 A | 8/2019 |
| JP | 2020-38797 A | 3/2020 |

(Continued)

OTHER PUBLICATIONS

XiaoYu Wu, "Conceptual Design and Orbit Dynamics in A 250 MeV Superconducting Synchrocyclotron", Submitted to Michigan State University in partial fulfillment of the requirements for the degree of Doctor of Philosophy, Department of Physics and Astronomy 1990.

(Continued)

*Primary Examiner* — Tung X Le
(74) *Attorney, Agent, or Firm* — MATTINGLY & MALUR, PC

(57) ABSTRACT

A disturbance magnetic field region provided in an outer peripheral portion of a main magnetic field region of an accelerator has a peeler region in which a strength of a magnetic field decreases toward an outside, a regenerator region in which the strength of the magnetic field increases toward the outside, and a substantially flat region in which the strength of the magnetic field is larger than the strength of the magnetic field of the peeler region and smaller than the strength of the magnetic field of the regenerator region.

8 Claims, 10 Drawing Sheets

(56) References Cited

U.S. PATENT DOCUMENTS

| | | | | |
|---|---|---|---|---|
| 10,456,602 | B2 * | 10/2019 | Ebina | H05H 7/04 |
| 10,548,212 | B2 * | 1/2020 | Aoki | H05H 13/04 |
| 10,806,019 | B2 * | 10/2020 | De Neuter | H05H 7/10 |
| 11,570,881 | B2 * | 1/2023 | Hae | H05H 13/00 |
| 2012/0274242 | A1 * | 11/2012 | Haruna | H05H 13/04<br>315/504 |
| 2021/0195725 | A1 * | 6/2021 | Hae | A61N 5/10 |
| 2021/0196984 | A1 | 7/2021 | Hae et al. | |

FOREIGN PATENT DOCUMENTS

| | | | |
|---|---|---|---|
| JP | 2020-64753 | A | 4/2020 |
| JP | 2021-7645 | A | 1/2021 |

OTHER PUBLICATIONS

Extended European Search Report received in corresponding European Application No. 23159063.9 dated Jul. 31, 2023.

Japanese Office Action received in corresponding Japanese Application No. 2022-031933 dated Jan. 21, 2025.

* cited by examiner

ACCELERATOR AND PARTICLE THERAPY SYSTEM

CROSS-REFERENCE TO RELATED APPLICATION

The present application claims priority from Japanese application JP2022-031933, filed on Mar. 2, 2022, the contents of which is hereby incorporated by reference into this application.

BACKGROUND OF THE INVENTION

1. Field of the Invention

The present disclosure relates to an accelerator and a particle therapy system.

2. Description of the Related Art

Particle therapy is a type of radiation therapy, and is a treatment method in which a tumor is irradiated with an ion beam such as a proton beam or a carbon beam to destroy cells in the tumor. A particle therapy system for performing the particle therapy includes an ion source that generates ions, an accelerator that accelerates ions generated by the ion source to form an ion beam, a beam transport system that transports the ion beam formed by the accelerator from the accelerator to a treatment room, a rotating gantry that changes an irradiation direction of the ion beam transported by the beam transport system with respect to a tumor, an irradiation system that irradiates the tumor with the ion beam from the rotating gantry, and a control system that controls these components.

In the particle therapy system, a circular accelerator such as a synchrotron, a cyclotron, or a synchronous cyclotron is used as the accelerator. In recent years, downsizing of a circular accelerator has been developed in order to downsize a particle therapy system. An effective means for downsizing the circular accelerator is to increase strength of a main magnetic field that circulates the ion beam in the circular accelerator, and an effective means for increasing the strength of the main magnetic field is to apply a superconducting magnet to a main electromagnet that generates the main magnetic field. For application of a superconducting magnet, a cyclotron and a synchronous cyclotron using a static main magnetic field are more suitable than a synchrotron that dynamically adjusts a magnitude of the main magnetic field. XiaoYu Wu, "Conceptual Design and Orbit Dynamics in a 250 MeV Superconducting Synchrocyclotron", Ph. D. Thesis, submitted to Michigan State University discloses a synchronous cyclotron using a superconducting magnet as a main electromagnet.

In a circular accelerator having a static main magnetic field such as a cyclotron and a synchronous cyclotron, generally, energy of an ion beam taken out to the outside is fixed, and energy of the ion beam irradiated to the tumor is adjusted by attenuating the ion beam by a scatterer called a degrader outside the circular accelerator.

Meanwhile, J P 2019-133745 A discloses a circular accelerator that does not require attenuating an ion beam outside by making the energy of the ion beam taken out to the outside variable while using a static main magnetic field.

The circular accelerator described in JP 2019-133745 A accelerates the ion beam circulating in the circular accelerator to desired energy, and then feeds a radiofrequency electric field in a direction (hereinafter, it is defined as a horizontal direction) substantially perpendicular to a traveling direction of the ion beam and a magnetic pole gap direction (hereinafter, it is defined as a vertical direction) of a main magnetic field to the ion beam. The ion beam to which the radiofrequency electric field is fed passes through a magnetic field region called a peeler magnetic field and a regenerator magnetic field in which an amplitude in a horizontal direction of betatron oscillation, which is oscillation centered on a central orbit, gradually increases to generate resonance of the betatron oscillation formed around the central orbit. The ion beam passing through the peeler magnetic field and the regenerator magnetic field rapidly increases in the amplitude of the betatron oscillation in the horizontal direction, enters a septum magnetic field for take-out, and is taken out to the outside of the accelerator.

XiaoYu Wu, "Conceptual Design and Orbit Dynamics in a 250 MeV Superconducting Synchrocyclotron", Ph. D. Thesis, submitted to Michigan State University

SUMMARY OF THE INVENTION

If an ion beam passes through a peeler magnetic field and a regenerator magnetic field, its amplitude in a horizontal direction rapidly increases due to resonance, and its amplitude in a vertical direction also increases. When the amplitude of the ion beam in the vertical direction increases, extraction efficiency of the ion beam decreases, and thus there is room for improvement in the extraction efficiency of the ion beam in the technique described in JP 2019-133745 A.

An object of the present disclosure is to provide an accelerator and a particle therapy system capable of improving ion beam extraction efficiency.

According to one aspect of the present disclosure, there is provided an accelerator that accelerates an ion beam while circulating the ion beam by a main magnetic field and an accelerating radiofrequency electric field, the accelerator including: a main magnetic field generation device including a plurality of magnetic poles arranged to face each other and exciting the main magnetic field in a space sandwiched between the magnetic poles; an extraction channel through which the ion beam is taken out; a displacement unit configured to displace an ion beam circulating in a main magnetic field region where the main magnetic field is excited to an outside of the main magnetic field region; and a disturbance magnetic field region provided on an outer peripheral portion of the main magnetic field region, the disturbance magnetic field region being configured to excite a magnetic field that disturbs the ion beam displaced outward and guides the ion beam to the extraction channel, in which the disturbance magnetic field region includes a first region in which the strength of the magnetic field decreases toward the outside, a second region in which the strength of the magnetic field increases toward the outside, and a third region in which strength of the magnetic field is larger than the strength of the magnetic field in the first region and smaller than the strength of the magnetic field in the second region.

According to the present invention, it is possible to improve ion beam extraction efficiency.

DESCRIPTION OF THE PREFERRED EMBODIMENTS

Hereinafter, embodiments of the present disclosure will be described with reference to the drawings.

First Embodiment

Figure 1:
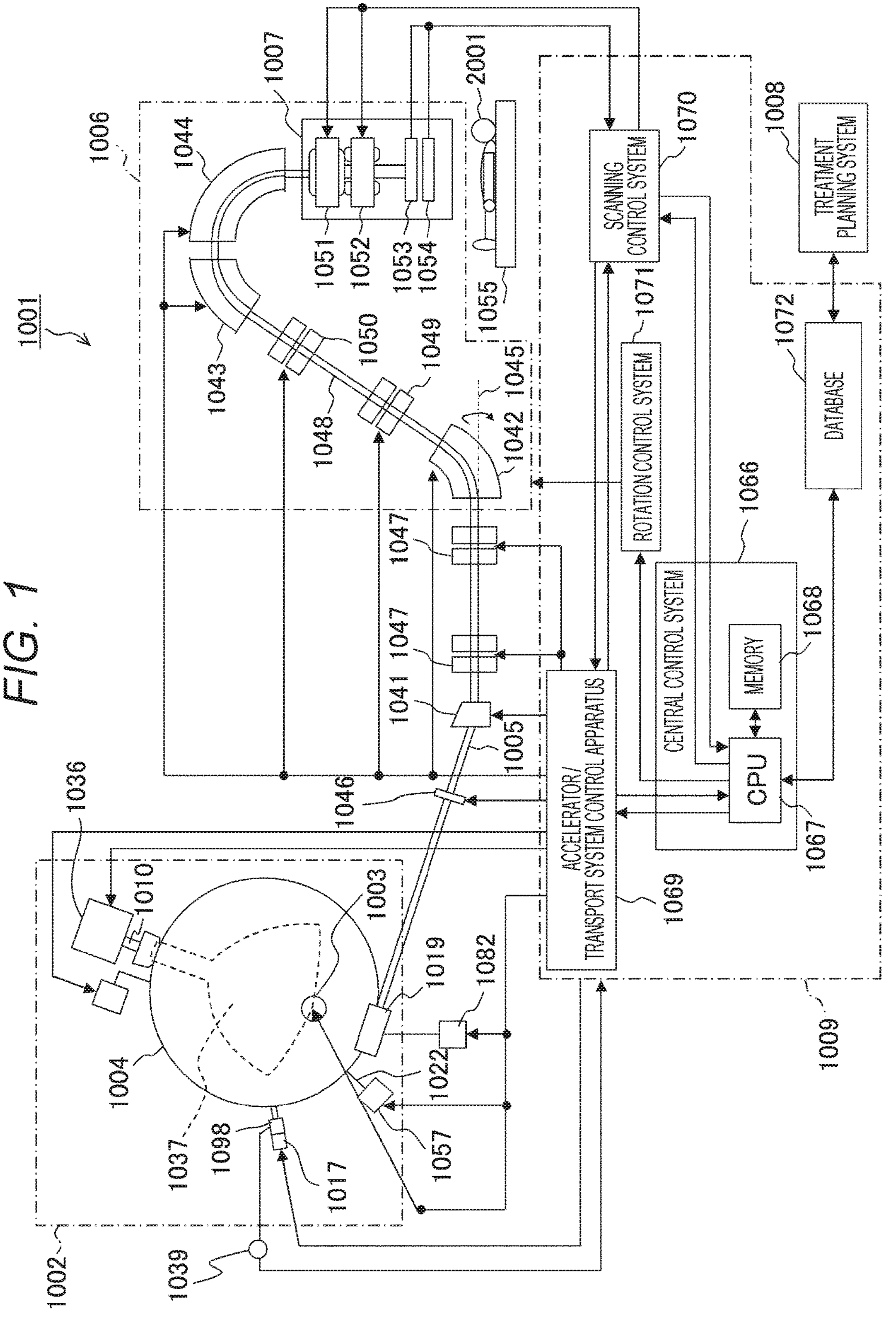
FIG. 1 is a configuration diagram of a particle therapy system according to an embodiment of the present disclosure.

FIG. 1 is a diagram illustrating an overall configuration of a particle therapy system according to an embodiment of the present disclosure. A particle therapy system 1001 illustrated in FIG. 1 is a system that irradiates a subject with an ion beam formed by accelerating ions by an accelerator 1004 described later. In the present embodiment, the accelerator 1004 accelerates and extracts, as an ion beam, an ion beam using hydrogen ions as ions, that is, protons, to arbitrary energy within a predetermined range. The predetermined range is a range from 70 MeV to 235 MeV in the present embodiment. However, the ion beam may be a heavy particle ion beam using helium, carbon, or the like, and the extraction energy, which is the energy of the ion beam to be extracted, is not limited to the range of 70 MeV to 235 Mev.

The particle therapy system 1001 illustrated in FIG. 1 is installed on a floor surface of a building (not illustrated). In addition, the particle therapy system 1001 includes an ion beam generation device 1002, a beam transport system 1005, a rotating gantry 1006, an irradiation device 1007, a treatment planning system 1008, and a control system 1009. The ion beam generation device 1002 includes an ion source 1003 and the accelerator 1004.

The ion source 1003 is an ion introduction device that supplies ions to the accelerator 1004. The accelerator 1004 accelerates the ions supplied from the ion source 1003 to form an ion beam, and extracts the ion beam. The accelerator 1004 is connected with a radiofrequency power supply 1036 as a power supply for driving the accelerator 1004, a coil excitation power supply 1057, and an extraction channel power supply 1082. In addition, an ion beam current measurement device 1098 that measures a current of the ion beam is connected to the accelerator 1004. The ion beam current measurement device 1098 includes a moving device 1017 and a position detector 1039. A more detailed description of the accelerator 1004 will be given later.

The beam transport system 1005 is a transport system that transports the ion beam extracted from the accelerator 1004 to the irradiation device 1007, and has an ion beam path 1048 through which the ion beam passes. The ion beam path 1048 is connected to an extraction channel 1019 for extracting an ion beam in the accelerator 1004 and to the irradiation device 1007. In the ion beam path 1048, electromagnets for transporting the ion beam from the accelerator 1004 toward the irradiation device 1007 are arranged in the order of a plurality of quadrupole magnets 1046, a bending magnet 1041, a plurality of quadrupole magnets 1047, a bending magnet 1042, a quadrupole magnet 1049, a quadrupole magnet 1050, a bending magnet 1043, and a bending magnet 1044.

The rotating gantry 1006 is configured to be rotatable about a rotation shaft 1045, and is a rotation device that rotates the irradiation device 1007 about the rotation shaft 1045. A part of the ion beam path 1048 is installed in the rotating gantry 1006. Among the electromagnets for transporting the ion beam, the bending magnet 1042, the quadrupole magnets 1049 and 1050, and the bending magnets 1043 and 1044 are installed in the rotating gantry 1006.

The irradiation device 1007 is attached to the rotating gantry 1006 and is connected to the ion beam path 1048 on the downstream side of the bending magnet 1044.

The irradiation device 1007 includes scanning magnets 1051 and 1052, a beam position monitor 1053, and a dose monitor 1054. The scanning magnets 1051 and 1052, the beam position monitor 1053, and the dose monitor 1054 are disposed in a casing (not illustrated) of the irradiation device 1007. The scanning magnets 1051 and 1052, the beam position monitor 1053, and the dose monitor 1054 are arranged along a center axis of the irradiation device 1007, that is, a beam axis of the ion beam.

Each of the scanning magnet 1051 and the scanning magnet 1052 constitutes a scanning system that deflects the ion beam and scans the ion beam in directions substantially orthogonal to each other in a plane substantially perpendicular to the central axis of the irradiation device 1007. The beam position monitor 1053 and the dose monitor 1054 are disposed downstream of the scanning magnets 1051 and 1052. The beam position monitor 1053 measures a passing position of the ion beam. The dose monitor 1054 measures the dose of the ion beam.

On the downstream side of the irradiation device 1007, a treatment table 1055 on which a patient 2001 as the subject lies is arranged to face the irradiation device 1007.

The treatment planning system 1008 generates an irradiation content of the ion beam for the patient 2001 as a treatment planning and notifies the control system 1009 of the treatment planning. The irradiation content includes, for example, an irradiation region of the ion beam, irradiation energy, an irradiation angle, the number of times of irradiation, and the like.

The control system 1009 is a control unit that controls the ion beam generation device 1002, the beam transport system 1005, the rotating gantry 1006, and the irradiation device 1007 according to the treatment planning notified from the treatment planning system 1008 and irradiates the patient 2001 with the ion beam.

The control system 1009 includes a central control system 1066, an accelerator/transport system control apparatus 1069, a scanning control system 1070, a rotation control system 1071, and a database 1072.

In accordance with the treatment planning notified from the treatment planning system 1008, the central control system 1066 controls the ion beam generation device 1002, the beam transport system 1005, the rotating gantry 1006, and the irradiation device 1007 via the accelerator/transport system control apparatus 1069, the scanning control system 1070, and the rotation control system 1071 to irradiate the patient 2001 with the ion beam.

The accelerator/transport system control apparatus 1069 controls the ion beam generation device 1002 and the beam transport system 1005. The scanning control system 1070 controls the irradiation device 1007. Specifically, the scanning control system 1070 controls the scanning magnet 1051 and the scanning magnet 1052 based on the measurement results of the beam position monitor 1053 and the dose monitor 1054 to scan the ion beam. The rotation control system 1071 controls the rotating gantry 1006. The database 1072 stores the treatment planning notified from the treatment planning system 1008. In addition, the database 1072 may store various types of information used by the central control system 1066.

In addition, the central control system 1066 includes a central processing unit (CPU) 1067 that is a central processing unit, and a memory 1068 connected to the CPU 1067. Note that the database 1072, the accelerator/transport system control apparatus 1069, the scanning control system 1070, and the rotation control system 1071 are connected to the CPU 1067 in the central control system 1066.

The CPU 1067 reads a program for controlling each device constituting the particle therapy system 1001 according to the treatment planning stored in the database 1072, and executes the read program to execute control processing for controlling each device in the particle therapy system 1001. Specifically, the CPU 1067 controls each device by outputting a command to each device via the accelerator/transport system control apparatus 1069, the scanning control system 1070, and the rotation control system 1071, and irradiates the patient 2001 with the ion beam according to the treatment planning. The memory 1068 is used as a work area of the program, and stores various data used and generated in the processing of the CPU 1067.

Note that the program executed by the CPU 1067 may be one program or may be divided into a plurality of programs. Part or all of the processing by the program may be realized by dedicated hardware. In addition, the program may be installed in the central control system 1066 from the database 1072, or may be installed in the central control system 1066 from a program distribution server (not illustrated), an external storage medium, or the like. Furthermore, each device in the control system 1009 may be configured in a form in which two or more devices are connected in a wired or wireless manner.

<Accelerator 1004>

Figure 2:
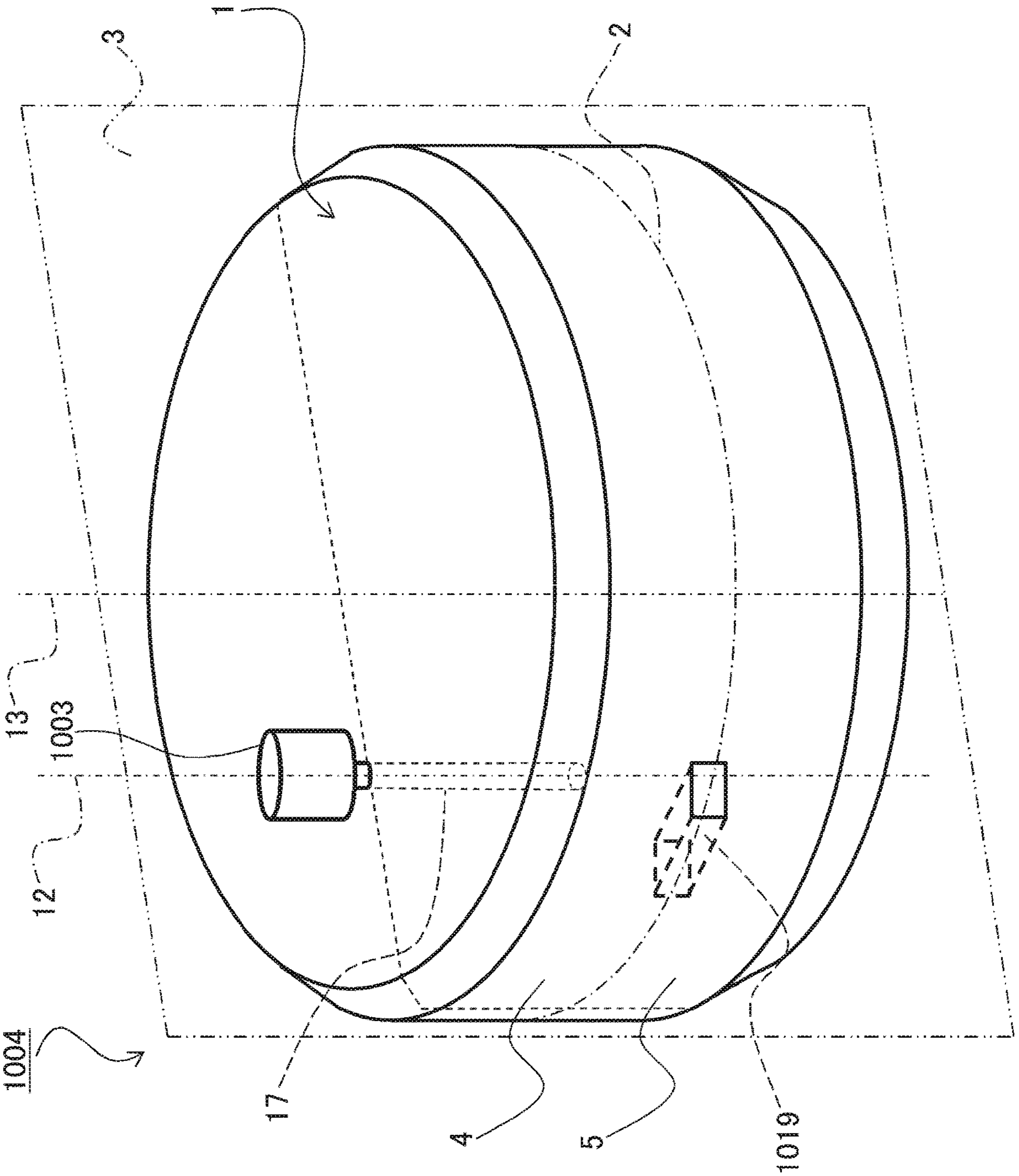
FIG. 2 is a perspective view of a main magnetic field magnet that generates a main magnetic field.

Next, the accelerator 1004 of the ion beam generation device 1002 will be described in more detail with reference to FIGS. 1 to 4. FIG. 2 is a perspective view of the accelerator 1004, FIG. 3 is a longitudinal sectional view along a vertical plane 3 of the accelerator 1004, and FIG. 4 is a transverse sectional view along an median plane 2 of the accelerator 1004.

(Main Magnetic Field Magnet 1)

Figure 3:
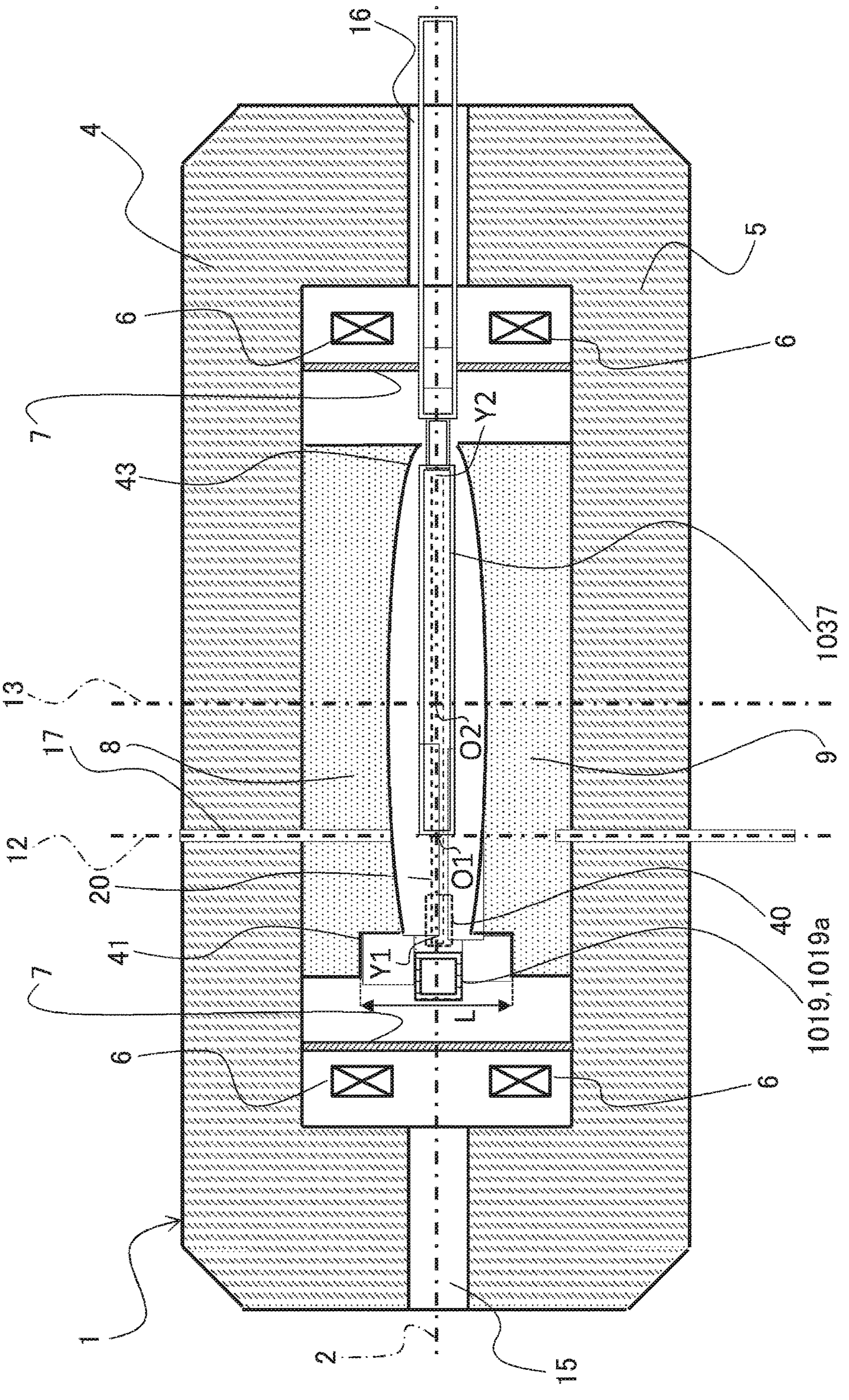
FIG. 3 is a longitudinal sectional view along a vertical plane of the main magnetic field magnet.
Figure 4:
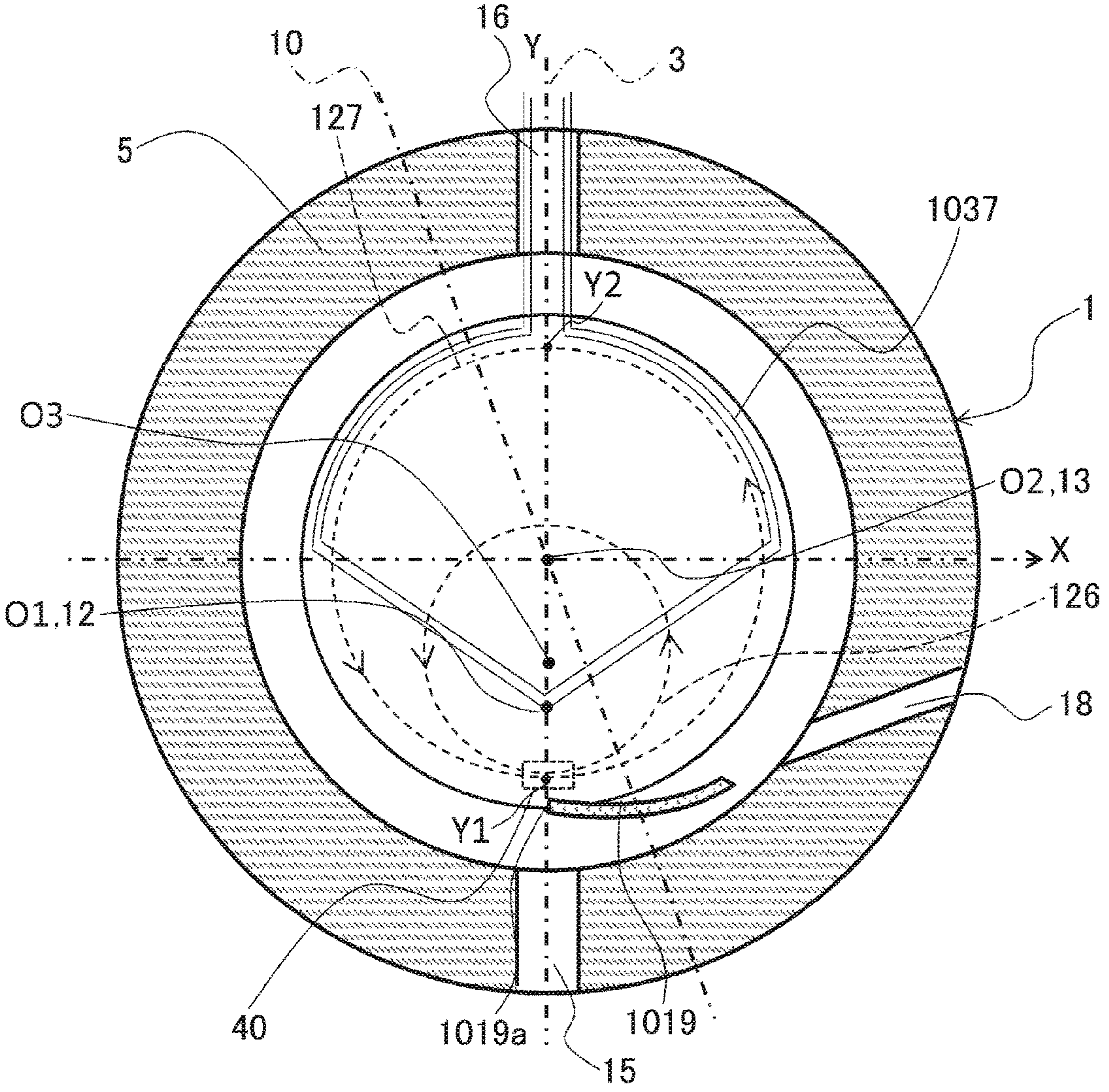
FIG. 4 is a transverse sectional view along an median plane of the main magnetic field magnet.

The accelerator 1004 has a main magnetic field magnet 1 as illustrated in FIGS. 2 to 4. The main magnetic field magnet 1 is a main magnetic field generation device that generates a main magnetic field for circulating an ion beam, and as illustrated in FIG. 2, the main magnetic field magnet 1 includes an upper return yoke 4 and a lower return yoke 5 having a substantially disk shape when viewed from the vertical direction.

The upper return yoke 4 and the lower return yoke 5 have substantially vertically symmetrical shapes with respect to the median plane 2. The median plane 2 substantially passes through the center of the main magnetic field magnet 1 in the vertical direction and substantially coincides with the orbit plane drawn by the ion beam accelerated in the accelerator 1004.

The upper return yoke 4 and the lower return yoke 5 have shapes substantially plane-symmetrical with respect to the vertical plane 3 which is substantially perpendicular to the median plane 2 and which is a plane passing through the center of the main magnetic field magnet 1 in the median plane 2. In FIG. 2, an intersection portion of the median plane 2 with respect to the main magnetic field magnet 1 is indicated by an alternate long and short dash line, and an intersection portion of the vertical plane 3 with respect to the main magnetic field magnet 1 is indicated by a broken line.

In a space surrounded by the upper return yoke 4 and the lower return yoke 5, as illustrated in FIG. 3, two coils 6 are arranged substantially plane-symmetrically with respect to the median plane 2. The coil 6 is a superconducting coil, and is made of, for example, a superconducting wire material using a superconductor such as niobium titanium. The coil 6 is installed inside a cryostat (not illustrated) that is a cooling device for cooling the coil 6, and is cooled to a certain temperature (temperature at which the coil 6 exhibits complete diamagnetism) or lower by the cryostat. In addition, the coil 6 is drawn to the outside of the main magnetic field magnet 1 by a coil drawing wire 1022 illustrated in FIG. 1 and is connected to the coil excitation power supply 1057. The coil excitation power supply 1057 is a power supply that supplies power to the coil 6, and is controlled by the accelerator/transport system control apparatus 1069.

The vacuum container 7 is provided inside the coil 6 in a space surrounded by the upper return yoke 4 and the lower return yoke 5. The vacuum container 7 is a container for keeping the inside in a vacuum state, and is made of, for example, stainless steel. Inside the vacuum container 7, an upper magnetic pole 8 and a lower magnetic pole 9 are arranged in plane symmetry with the median plane 2 interposed therebetween, and are coupled to the upper return yoke 4 and the lower return yoke 5, respectively. The upper return yoke 4, the lower return yoke 5, the upper magnetic pole 8, and the lower magnetic pole 9 are formed of, for example, pure iron or low carbon steel having a reduced impurity concentration.

The main magnetic field magnet 1 having the above configuration forms a main magnetic field that feeds a vertical magnetic field to an internal acceleration space 20 centered on the median plane 2. The main magnetic field is substantially uniform in the median plane 2, but has a slightly non-uniform intensity distribution.

The strength of the main magnetic field is designed so that the ions supplied from the ion source 1003 stably circulate in the acceleration space 20 as an ion beam on the principle of weak focusing. The principle of the weak focusing is a principle indicating that the main magnetic field monotonously decreases toward an outer periphery, and when the gradient thereof is included between a predetermined upper limit value and a lower limit value, ions stably circulate as an ion beam.

Figure 5:
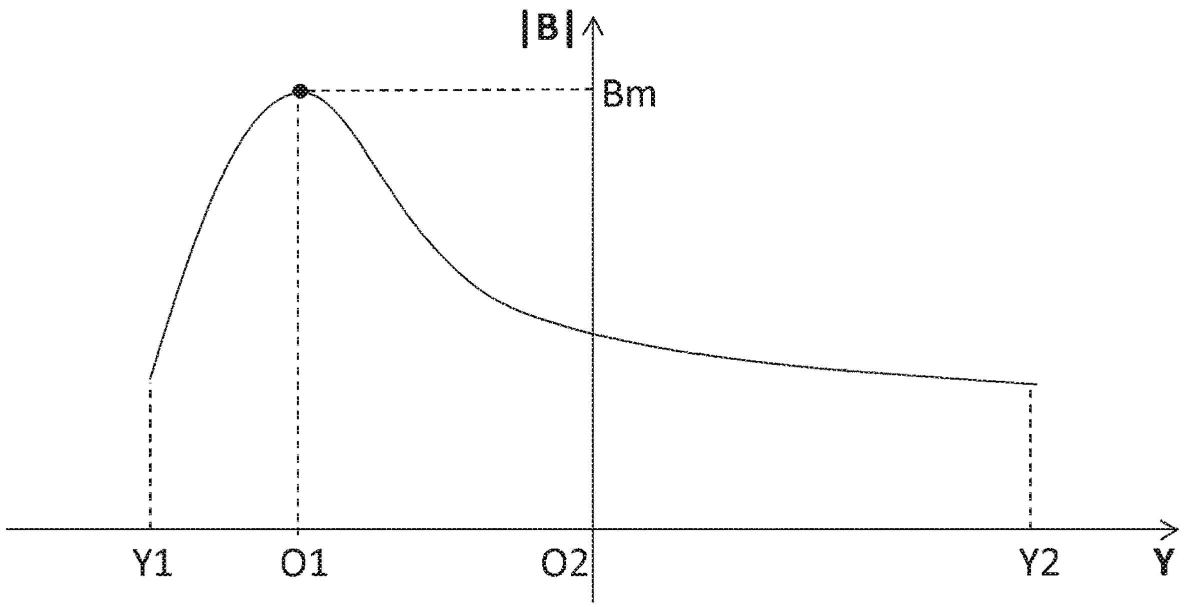
FIG. 5 is a diagram illustrating a magnetic field distribution on a center line of the main magnetic field.

FIG. 5 is a diagram illustrating intensity distribution on a center line of a main magnetic field. The center line is an intersection line between the median plane 2 and the vertical plane 3. In the present embodiment, a direction along the intersection line is a Y-axis direction, and a direction perpendicular to a Y-axis direction on the median plane 2 is an X-axis direction.

As illustrated in FIG. 5, the intensity of the main magnetic field is the largest at a predetermined position O1 shifted in the Y-axis direction from a magnetic pole center O2 which is the center of the upper magnetic pole 8 and the lower magnetic pole 9 in the median plane 2 direction, and gradually decreases as approaching the outer peripheries of the upper magnetic pole 8 and the lower magnetic pole 9. Hereinafter, the position O1 may be referred to as a center of the main magnetic field distribution.

(Ion Source 1003)

In the example of FIG. 2, the ion source 1003 is installed on the main magnetic field magnet 1. The upper return yoke 4 and the upper magnetic pole 8 are provided with a through hole 17 for guiding ions from the ion source 1003 to the position O1 of the acceleration space 20. A central axis (ion entrance axis) 12 of the through hole 24 is substantially perpendicular to the median plane 2 and passes to the position O1. The ion source 1003 is disposed above the through hole 17, and introduces ions into the position O1 of the acceleration space 20 through the through hole 17. Note that the ion source 1003 may be installed inside the main magnetic field magnet 1. In this case, the through hole 17 is unnecessary.

(Extraction Channel 1019)

In addition, as illustrated in FIGS. 2 to 4, the accelerator 1004 includes an extraction channel 1019 that takes out an ion beam and extracts the ion beam to the beam transport system 1005. In the present embodiment, the extraction channel 1019 has a configuration including an electromagnet (not illustrated), and is arranged outside the acceleration space 20, more specifically, at the outer peripheral portion closer to the center O1 of the main magnetic field distribution on the Y axis of the upper magnetic pole 8 and the lower magnetic pole 9. The extraction channel 1019 has an opening 1019*a* in the vicinity of the Y axis, takes in an ion beam of desired energy from the opening 1019*a*, and takes out the ion beam to the outside of the accelerator 1004 through the through holes 18 provided in the upper return yoke 4 and the lower return yoke 5. A front end of the beam transport system 1005 is installed in the through hole 18, and the taken-out ion beam is guided to the irradiation device 1007 via the beam transport system 1005.

A power supply line that supplies power to the electromagnets of the extraction channel 1019 is drawn out of the accelerator 1004 from the through holes 15 provided in the upper return yoke 4 and the lower return yoke 5, and is connected to the extraction channel power supply 1082 illustrated in FIG. 1. The extraction channel power supply 1082 is a power supply that can supply power to an output channel, and is controlled by the accelerator/transport system control apparatus 1069. Note that the extraction channel 1019 may include only a magnetic body without including an electromagnet. In this case, no power supply is required for the extraction channel 1019.

(Radiofrequency Acceleration Cavity 1037)

In addition, the accelerator 1004 includes a radiofrequency acceleration cavity 1037 that is a member for accelerating ions incident on the acceleration space 20 to form an ion beam. The radiofrequency acceleration cavity 1037 includes a pair of dee electrodes 1037*a* disposed with the median plane 2 therebetween. The dee electrode 1037*a* has a fan shape when viewed from the vertical direction. The dee electrode 1037*a* is arranged such that an apex (center) of the fan shape is in the vicinity of the center O1 of the main magnetic field distribution and covers a part of the orbit of the ion beam including the magnetic pole center O2.

A ground electrode (not illustrated) is disposed so as to face a radial end surface of the dee electrode 1037*a*, and an acceleration electric field, which is an accelerating radiofrequency electric field for accelerating the ion beam, is formed between the radial end surface of the dee electrode 1037*a* and the ground electrode.

Since the dee electrode 1037*a* is formed in a fan shape having the position O1 as an apex, it is possible to feed the acceleration electric field to a position where a traveling direction of the circulating ion beam is parallel to the acceleration electric field, that is, the axis parallel to the X axis passing through the center of each closed orbit in which the ion beam circulates intersects each closed orbit.

The radiofrequency acceleration cavity 1037 is drawn out to the outside of the main magnetic field magnet 1 through a through hole 16 provided between the upper return yoke 4 and the lower return yoke 5 along the Y-axis direction, and is connected to a waveguide 1010 outside the main magnetic field magnet 1. The radiofrequency power supply 1036 is connected to the waveguide 1010. The radiofrequency power supply 1036 is a power supply that supplies power to the radiofrequency acceleration cavity 1037 through the waveguide 1010, and is controlled by the accelerator/transport system control apparatus 1069. By the power supplied from the radiofrequency power supply 1036, a radiofrequency electric field is excited as an acceleration electric field between the dee electrode 1037*a* and the ground electrode.

The orbit radius of the closed orbit, which is the orbit of the ion beam that circulates in the acceleration space 20, gradually increases with the acceleration of the ion beam as described later. In order to appropriately accelerate the ion beam, the acceleration electric field needs to be synchronized with the ion beam, and for this purpose, a resonance frequency of the radiofrequency acceleration cavity 1037 needs to be modulated according to energy of the ion beam. The modulation of the resonance frequency is performed, for example, by adjusting inductance or capacitance of the radiofrequency acceleration cavity 1037. As an adjustment method for adjusting the inductance or the capacitance of the radiofrequency acceleration cavity 1037, a known method can be used. For example, when the capacitance is adjusted, the resonance frequency is modulated by controlling the capacitance of the variable capacitance capacitor connected to the radiofrequency acceleration cavity 1037.

(Sparseness and Denseness of Closed Orbit)

Figure 6:
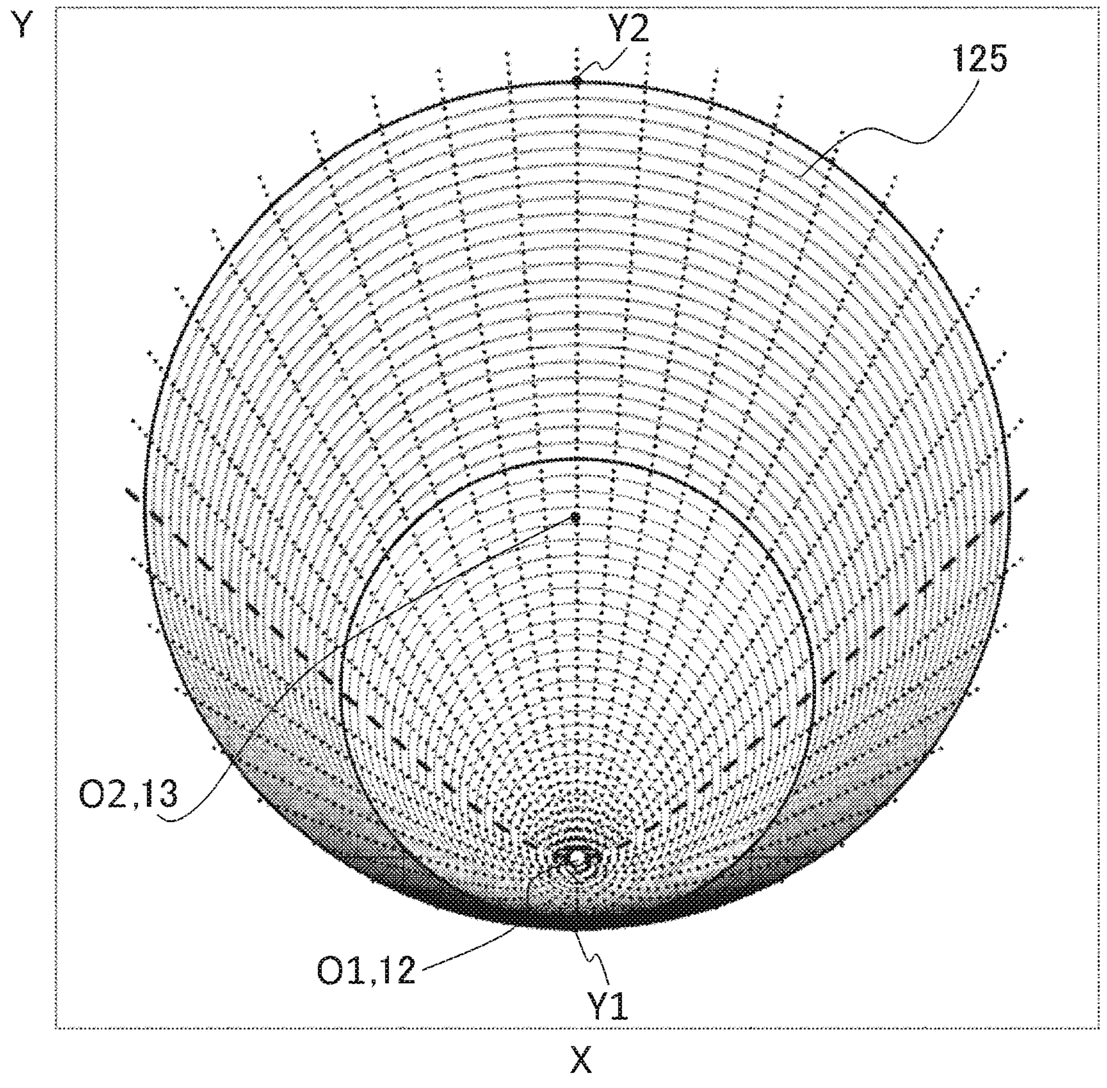
FIG. 6 is a diagram for explaining a closed orbit of an ion beam.

FIG. 6 is a diagram for explaining the closed orbit of the ion beam that circulates the acceleration space 20, and illustrates each closed orbit 125 of the ion beams having different energies.

The ions introduced from the ion source 1003 into the acceleration space 20 are formed as an ion beam by a radiofrequency electric field which is an acceleration electric field, and circulate in the acceleration space 20. As illustrated in FIG. 5, the main magnetic field in the acceleration space 20 is maximum at a position O1 shifted from the magnetic pole center O2, and gradually decreases toward the outer peripheries of the upper magnetic pole 8 and the lower magnetic pole 9. In this case, the ion beam with low energy circulates along the orbit centered at the position O1. As the ion beam is accelerated by the radiofrequency electric field, the orbit radius increases, and the center of the orbit gradually approaches the position O2 of the central axis 13 of the upper magnetic pole 8 and the lower magnetic pole 9. A closed orbit 127 of the ion beam having the maximum energy illustrated in FIG. 4 has a shape substantially along the outer peripheries of the upper magnetic pole 8 and the lower magnetic pole 9, and the center thereof substantially coincides with the position O2.

Therefore, as illustrated in FIG. 6, the closed orbit 125 of the ion beam is dense between the position O1 and a position Y1 of an end portion of the acceleration space 20 in the Y axis direction, and is sparse between the position O1 and a position Y2 of an end portion in the Y axis direction on the opposite side across the position O2 of the centers of the upper magnetic pole 8 and the lower magnetic pole 9.

For example, as illustrated in FIG. 4, the center of the closed orbit 127 of the maximum energy beam corresponding to the maximum energy (235. Mev) of the ion beams that can be taken out in the closed orbit 125 substantially coincides with the magnetic pole center O2. In addition, a center O3 of a closed orbit 126 of the lowest energy beam corresponding to the lowest energy among the ion beams that can be taken out is on a line segment connecting the magnetic pole center O2 and the center O1 of the main magnetic field distribution.

(Take-Out of Ion Beam)

The accelerator 1004 includes a radiofrequency kicker 40, a peeler region 31, a regenerator region 32, and a substantially flat region 33 as a mechanism for guiding the ion beam circling in the acceleration space 20 to the extraction channel 1019, and takes out an ion beam having energy in a predetermined range using the density of the closed orbit 125.

The radiofrequency kicker 40 is a displacement unit that displaces the ion beam circulating in the main magnetic field region where the main magnetic field in the acceleration space 20 is excited outward. The radiofrequency kicker 40 feeds, for example, a horizontal radiofrequency electric field to the ion beam to increase an amplitude of betatron oscillation of the ion beam. As a result, the ion beam is displaced so as to pass through the peeler region 31, the regenerator region 32, and the substantially flat region 33. The peeler region 31, the regenerator region 32, and the substantially flat region 33 constitute a disturbance magnetic field region that applies a disturbance to the ion beam displaced by the radiofrequency kicker 40 and that excites a magnetic field to guide the ion beam to the extraction channel 1019.

Figure 7:
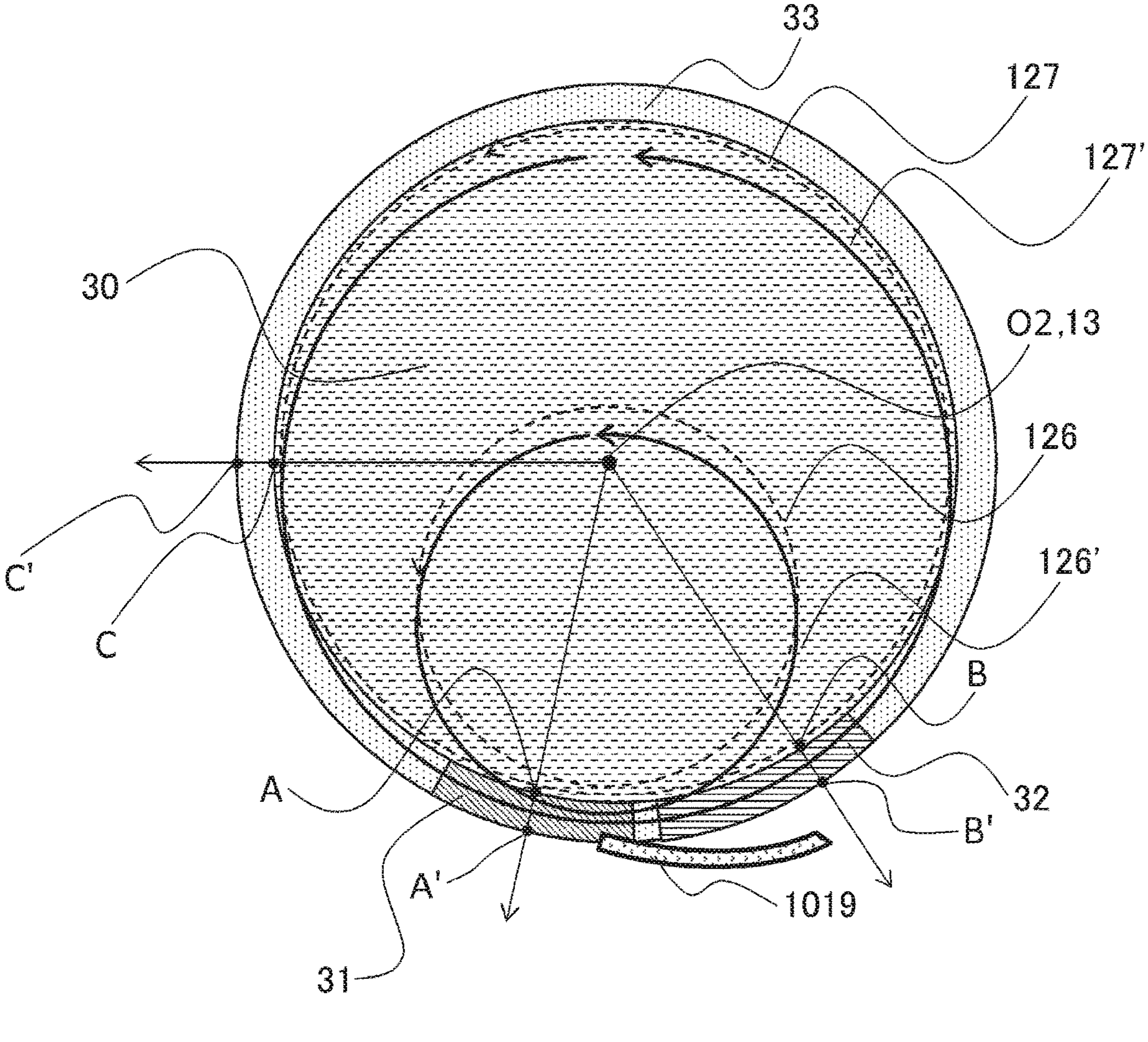
FIG. 7 is a schematic diagram schematically illustrating a magnetic field distribution on the median plane of the main magnetic field.

FIG. 7 is a diagram for explaining the arrangement of the peeler region 31, the regenerator region 32, and the substantially flat region 33, and illustrates a magnetic field distribution on the median plane 2 around which the ion beam circles.

In the main magnetic field region 30 illustrated in FIG. 7, the magnetic field distribution illustrated in FIG. 5 is formed. The peeler region 31, the regenerator region 32, and the substantially flat region 33 are formed at a magnetic pole peripheral edge portion outside the main magnetic field region 30. The peeler region 31 and the regenerator region 32 are outside a dense region where the closed orbit 125 of the ion beam in the main magnetic field region 30 is dense.

Figure 8:
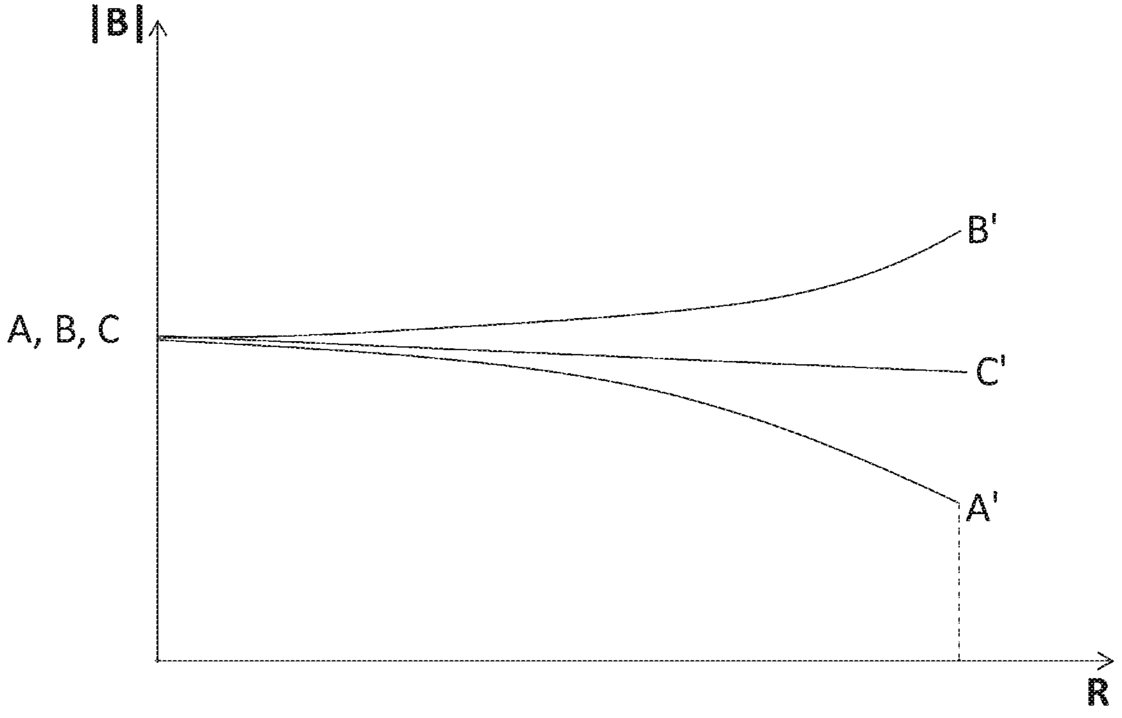
FIG. 8 is a diagram illustrating a radial distribution of a magnetic field on an median plane in a magnetic pole peripheral edge portion.

FIG. 8 is a diagram illustrating radial distributions of magnetic fields in the peeler region 31, the regenerator region 32, and the substantially flat region 33. The magnetic field distribution of the peeler region 31 corresponds to a magnetic field distribution along a line AA' of FIG. 7, the magnetic field distribution of the regenerator region 32 corresponds to a magnetic field distribution along a BB' line of FIG. 7, and the magnetic field distribution of the substantially flat region 33 corresponds to the magnetic field distribution along a CC' line of FIG. 7.

The magnetic fields at the innermost positions (positions A, B, and C) of the peeler region 31, the regenerator region 32, and the substantially flat region 33 substantially coincide with each other. The peeler region 31 is a first region where the strength of the magnetic field decreases relatively significantly towards the outside (from A to A'). The regenerator region 32 is a second region in which the strength of the magnetic field increases relatively greatly toward the outside (from B to B'). The substantially flat region 33 is a third region in which the magnetic field is substantially constant. In the present embodiment, the magnetic field of the substantially flat region 33 decreases toward the outside (from C to C') more gradually and more slightly than the magnetic field of the peeler region 31. Therefore, in the outer peripheral portion of each region, the magnetic field of the peeler region 31 is the smallest, the magnetic field of the regenerator region 32 is the largest, and the magnetic field of the flat region 33 is between the magnetic fields of the peeler region 31 and the regenerator region 32.

Hereinafter, an operation for taking out an ion beam having desired energy from the accelerator 1004 will be described.

The accelerator/transport system control apparatus 1069 causes the ion source 1003 to generate ions in accordance with a command from the central control system 1066, and introduces the ions to the position O1 in the acceleration space 20 in the main magnetic field magnet 1 through the through hole 17. The accelerator/transport system control apparatus 1069 generates an acceleration electric field in the acceleration space 20 using the radiofrequency acceleration cavity 1037, and accelerates ions to form an ion beam. The formed ion beam increases energy while circling.

When the ion beam reaches the desired energy, the accelerator/transport system control apparatus 1069 turns off the power supplied to the radiofrequency acceleration cavity 1037 and turns on the radiofrequency kicker 40. As a result, a radiofrequency electric field is fed to the ion beam in superposition with the main magnetic field. As a result, the closed orbit 125 of the ion beam is displaced in the radial direction (direction approaching the position Y1). For example, as illustrated in FIG. 7, when the ion beam is the lowest energy beam, the closed orbit 126 is displaced in the radial direction like a closed orbit 126', and when the ion beam is the maximum energy beam, the closed orbit 127 is displaced in the radial direction like a closed orbit 127'.

As a result, the ion beam passes through the peeler region 31 and the regenerator region 32. Therefore, resonance of horizontal betatron oscillation called 2/2 resonance occurs, and the ion beam diverges in the radial direction and reaches the opening 1019*a* of the extraction channel 1019. The ion beam is completely separated from the closed orbit by the extraction channel 1019 and taken out to the outside of the accelerator 1004 through the through hole 18.

Figure 9:
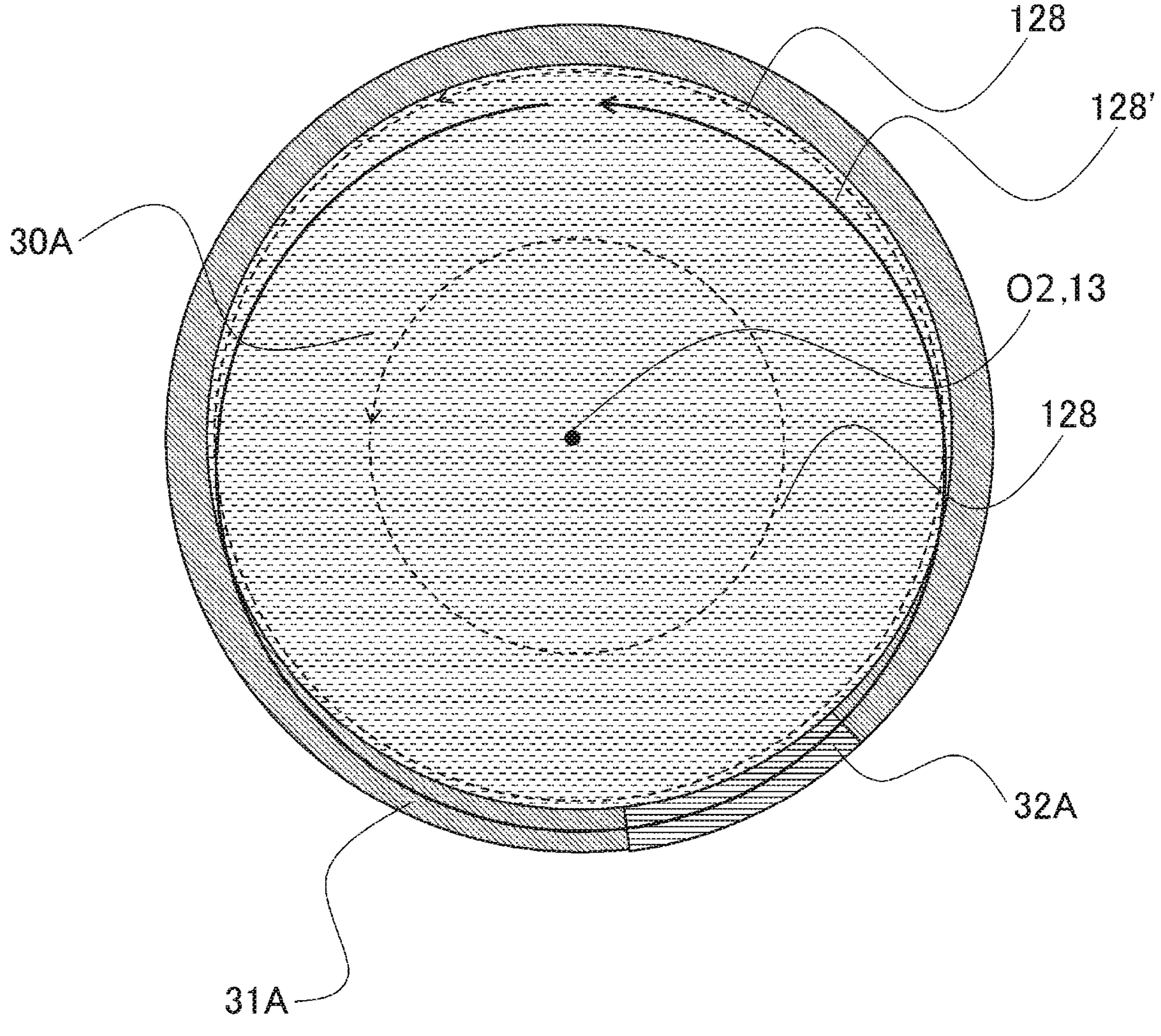
FIG. 9 is a diagram for describing a comparative example.

FIG. 9 is a diagram for describing a conventional method which is a method for taking out an ion beam described in XiaoYu Wu, "Conceptual Design and Orbit Dynamics in a 250 MeV Superconducting Synchrocyclotron", Ph. D. Thesis, submitted to Michigan State University, as a comparative example.

In the conventional method, only the ion beam having the maximum energy is an object to be taken out. Therefore, a closed orbit 128 of the ion beam that circulates around a main magnetic field region 30A is concentrically formed, and the closed orbit is expanded by accelerating the ion beam, so that the ion beam passes through a peeler region 31A and a regenerator region 32A. In this case, since it is sufficient to take out only the ion beam having the maximum energy, the peeler region 31A is formed over the entire circumference of a magnetic pole peripheral edge portion excluding the regenerator region 32A. That is, a magnetic field gradient of the peeler region 31A and a magnetic field gradient of the regenerator region 32A are designed in consideration of only the ion beam having the maximum energy.

On the other hand, in the present embodiment, the energy of the ion beam to be taken out is variable. Therefore, it is necessary to form the peeler region 31 and the regenerator region 32 in a region through which not only the maximum energy beam but also the minimum energy beam passes.

In order to properly cause resonance due to the betatron oscillation, a product of the magnitude of the magnetic field gradient and the length passing through the region having the magnetic field gradient is important. As illustrated in FIG. 7, the length of the ion beam passing through the peeler region 31 and the regenerator region 32 decreases as the energy of the ion beam decreases. Therefore, in order to cause resonance in the low-energy ion beam, it is preferable to increase the magnetic field gradient so as to compensate for the short length of the passage through the peeler region 31 and the regenerator region 32.

The ion beam having energy greater than the lowest energy beam passes through the same peeler region 31 and regenerator region 32 as the lowest energy beam. For this reason, when a region in which a gradient magnetic field is distributed, such as the peeler region 31A of the comparative example, is formed instead of the substantially flat region 33, the product of the magnitude of the magnetic field gradient and the length passing through the region having the magnetic field gradient becomes too large, and the ion beam becomes unstable in the horizontal direction and the vertical direction.

Therefore, in the present embodiment, the peeler region 31 is limited to a narrow range, and the magnetic pole peripheral edge portion excluding the peeler region 31 and the regenerator region 32 is the substantially flat region 33 having a substantially constant magnetic field as illustrated in FIG. 8. Since it is natural that the magnetic field decreases in the magnetic pole peripheral edge portion and the ion beam is stabilized by the principle of weak focusing, the magnetic field in the substantially flat region 33 has a slight decrease gradient in the present embodiment.

Figure 10:
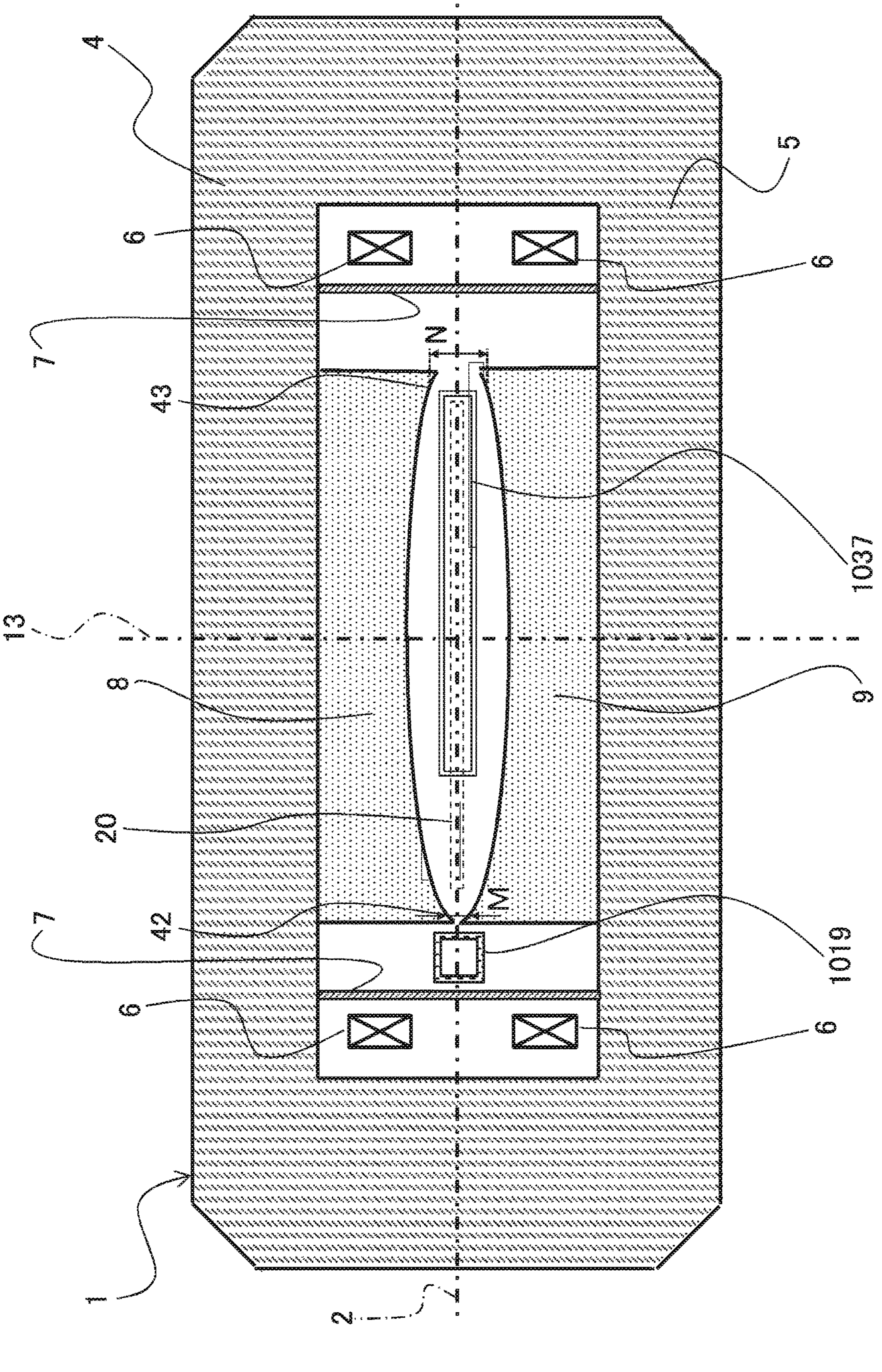
FIG. 10 is a cross-sectional view of the main magnetic field magnet taken along another vertical plane.

In addition, in the present embodiment, in order to make the magnetic field gradient of the peeler region 31 larger than that of the comparative example, as illustrated in FIG. 3, a gap interval L between the upper magnetic pole 8 and the lower magnetic pole 9 at a position 41 sandwiching the peeler region 31 is significantly wider than a gap interval at a position sandwiching the regenerator region 32 and a position sandwiching the substantially flat region 33. FIG. 10 is a longitudinal sectional view of the accelerator 1004 along a vertical plane passing through the regenerator region 32, and illustrates a gap interval M at a position 42 sandwiching the regenerator region 32 and a gap interval N at a position 43 sandwiching the substantially flat region 33. As illustrated in FIG. 10, the gap interval N is wider than the gap interval M.

Furthermore, in the present embodiment, the opening 1019*a*, which is the entrance of the extraction channel 1019, is installed at the position of the peeler region 31 by using the fact that the gap interval L at the position 41 sandwiching the peeler region 31 is large. However, the opening 1019*a* may not be installed at the position of the peeler region 31.

As described above, according to the present embodiment, the disturbance magnetic field region provided in the outer peripheral portion of the main magnetic field region 30 of the accelerator 1004 includes the peeler region 31 in which the strength of the magnetic field decreases toward the outside, the regenerator region 32 in which the strength of the magnetic field increases toward the outside, and the substantially flat region 33 in which the strength of the magnetic field is larger than the strength of the magnetic field of the peeler region 31 and smaller than the strength of the magnetic field of the regenerator region 32. Therefore, it is possible to shorten the distance that the ion beam passes through the peeler region 31 and the regenerator region 32, which are regions where the resonance of the betatron oscillation of the ion beam occurs, so that it is possible to suppress an increase in the amplitude of the ion beam in the vertical direction and to improve the ion beam extraction efficiency.

Further, in the present embodiment, in the substantially flat region 33, the strength of the magnetic field decreases more gradually toward the outside than in the peeler region 31. In this case, the ion beam can stably pass through the peeler region 31 and the regenerator region 32 by the principle of weak focusing.

Furthermore, in the present embodiment, the ion source 1003 introduces ions to a predetermined position O1 on the extraction channel side of the magnetic pole center O2 in the main magnetic field region 30. The peeler region 31 and the regenerator region 32 are provided closer to the extraction channel 1019 than the position O1 where ions are introduced by the ion source 1003. In this case, it is possible to form a dense closed orbit on the side of the extraction channel 1019, and thus, it is possible to reduce an amount of kicking required to take out the beam, and it is possible to easily take out the beam having desired energy.

Further, in the present embodiment, since the substantially flat region 33 is larger than the combined region of the peeler region 31 and the regenerator region 32, the distance that the ion beam passes through the peeler region 31 and the regenerator region 32 can be further shortened.

Further, in the present embodiment, the opening 1019*a* which is the inlet of the extraction channel 1019 is provided in the peeler region 31. In this case, the number of turns until the taken-out ion beam reaches the opening 1019*a* can be reduced by about 1 or 2 as compared with the case where the opening 1019*a* of the extraction channel 1019 is installed outside the peeler region 31. As a result, since it is possible to suppress the spread of the ion beam in the vertical direction and the horizontal direction, it is possible to improve the quality of the taken-out ion beam.

In addition, in the present embodiment, the main magnetic field magnet 1 generates the main magnetic field so that the closed orbit around which the ion beam circulates while accelerated is dense on one side. Therefore, it is possible to reduce the amount of kicking required to take out the beam, and it is possible to easily take out the beam having desired energy.

The above-described embodiments of the present disclosure are examples for describing the present disclosure, and are not intended to limit the scope of the present disclosure only to the embodiments. Those skilled in the art can practice the present disclosure in various other aspects without departing from the scope of the present disclosure.

What is claimed is:

1. An accelerator that accelerates an ion beam while circulating the ion beam by a main magnetic field and an accelerating radiofrequency electric field, the accelerator comprising:

a main magnetic field generation device including a plurality of magnetic poles arranged to face each other and exciting the main magnetic field in a space sandwiched between the magnetic poles;

an extraction channel through which the ion beam is taken out;

a displacement unit configured to displace an ion beam circulating in a main magnetic field region where the main magnetic field is excited to an outside of the main magnetic field region; and a disturbance magnetic field region provided on an outer peripheral portion of the main magnetic field region, the disturbance magnetic field region being configured to excite a magnetic field that disturbs the ion beam displaced to the outside of the main magnetic field region and guides the ion beam to the extraction channel, wherein the disturbance magnetic field region includes a first region in which the strength of the magnetic field decreases toward the outside, a second region in which the strength of the magnetic field increases toward the outside, and a third region in which the strength of the magnetic field is larger than the strength of the magnetic field in the first region and smaller than the strength of the magnetic field in the second region.

2. The accelerator according to claim 1, wherein in the third region, the strength of the magnetic field decreases more gradually toward the outside than in the first region.

3. The accelerator according to claim 1, further comprising an ion introduction device configured to introduce ions for forming the ion beam into a predetermined position on a side of the extraction channel with respect to a center of the magnetic pole in the main magnetic field region, wherein the first region and the second region are provided closer to the extraction channel than the predetermined position.

4. The accelerator according to claim 1, wherein the third region is larger than a combined region of the first region and the second region.

5. The accelerator according to claim 1, wherein an inlet through which the ion beam is incident in the extraction channel is provided in the first region.

6. The accelerator according to claim 1, wherein an interval of a first portion of the magnetic pole sandwiching the first region is wider than an interval of a second portioin of the magmetic pole sandwiching the second region, and an interval of a third portion of the magnetic pole sandwiching the third region is narrower than the interval of the first portion and wider than the interval of the second portion.

7. The accelerator according to claim 1, wherein the main magnetic field generationdevice generates the main magnetic field such that a closed orbit around which the ion beam circulates whiile accelerated is dense on one side.

8. A particle therapy system comprising:

the accelerator according to claim 1; and an irradiation device that irradiates the ion beam taken out from the accelerator.

* * * * *